United States Patent [19]

Watson, Sr. et al.

[11] Patent Number: 4,528,168

[45] Date of Patent: Jul. 9, 1985

[54] BRINE SATURATOR METHOD OF OPERATION

[75] Inventors: John D. Watson, Sr., Lake Jackson; Billie B. Rhodes, Angleton, both of Tex.

[73] Assignee: The Dow Chemical Company, Midland, Mich.

[21] Appl. No.: 542,296

[22] Filed: Oct. 14, 1983

[51] Int. Cl.³ .............................................. C01B 9/00
[52] U.S. Cl. ................................... 423/184; 423/499; 23/293 R; 23/306
[58] Field of Search .................. 423/184, 499, 179; 422/255, 256; 23/306, 293 R

[56] References Cited

U.S. PATENT DOCUMENTS

| | | | |
|---|---|---|---|
| 3,130,016 | 4/1964 | Grier | 423/179 |
| 3,236,609 | 2/1966 | MacKinnon | 423/179 |
| 3,623,848 | 11/1971 | Fisher et al. | 423/499 |
| 3,800,026 | 3/1974 | Morgan | 423/179 |

Primary Examiner—L. Dewayne Rutledge
Assistant Examiner—Christopher W. Brody
Attorney, Agent, or Firm—V. Dean Clausen

[57] ABSTRACT

An apparatus is disclosed for dissolving salt in an undersaturated brine to bring the brine up to saturation conditions. A salt slurry, specifically sodium chloride, is brought into a holding tank and recycled to keep the solids suspended in the liquid. Part of the recycling salt stream is diverted to a saturator unit consisting of an upright column and a slurry feed tube mounted inside and coaxial with the column. The slurry passes downwardly through the feed tube and mixes with an undersaturated brine stream entering through the bottom of the column. This mixture flows upwardly through an annulus section defined between the feed tube and saturator column, with the salt dissolving in the brine during the upward flow. Saturated brine is removed at the top of the column for ultimate use, such as in chlorine cells.

6 Claims, 1 Drawing Figure

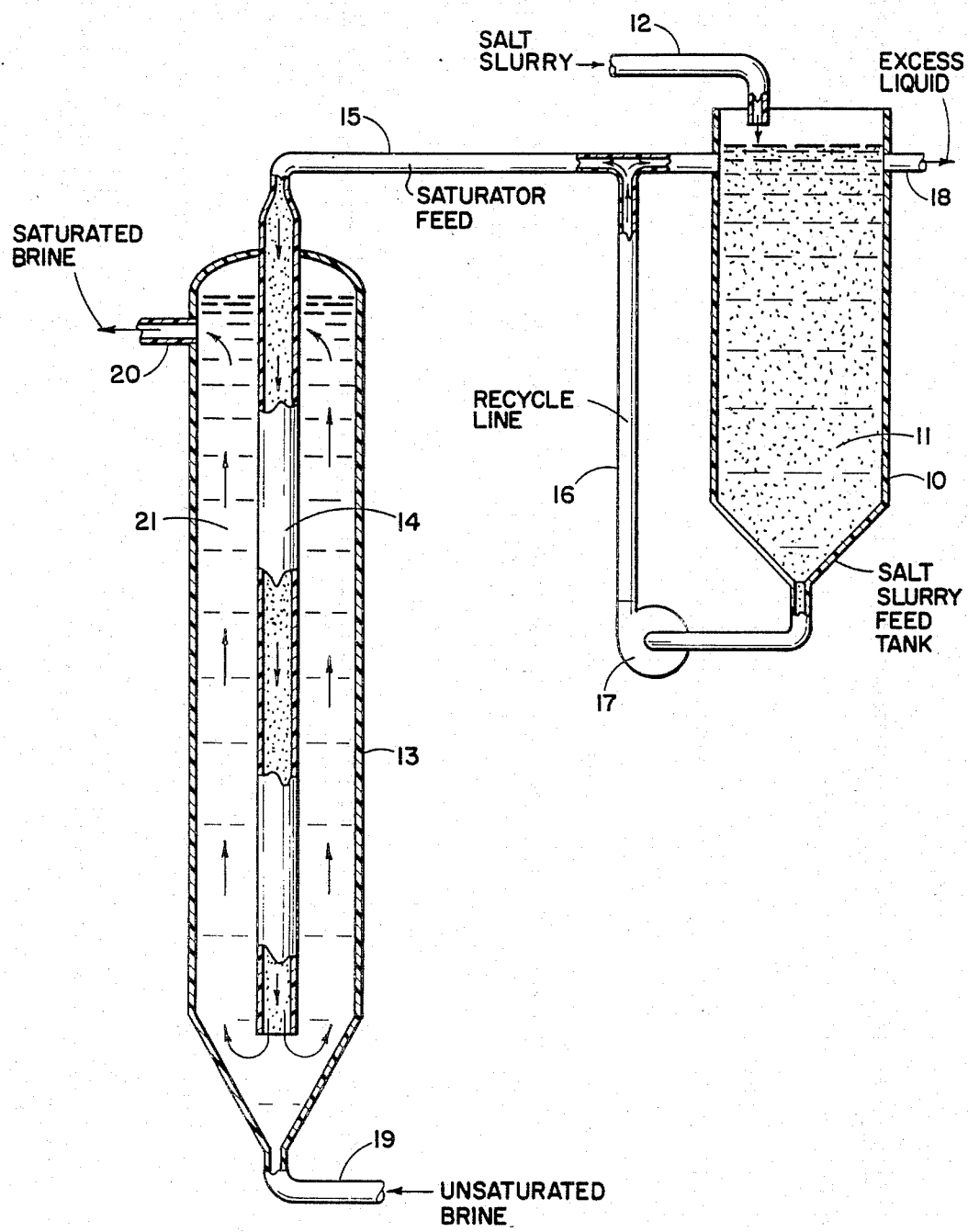

BRINE SATURATOR METHOD OF OPERATION

BACKGROUND OF THE INVENTION

The invention relates to an apparatus for producing a saturated salt brine solution. More specifically, the invention relates to an apparatus and method for dissolving salt in an undersaturated brine to bring the solution up to a saturated condition.

Salt brine is used in many industrial processes, either as a dilute solution, or a saturated solution. One of these processes is the production of chlorine by the electrolysis of salt (specifically sodium chloride) brine in diaphragm cells or mercury cathode cells. In most chlorine processes the brine feed for the cells is pumped out of underground wells or salt deposits and treated to remove impurities before being passed into the cells. Saturated brine contains about 320 grams/liter of sodium chloride at ambient temperature and pressure. The concentration of sodium chloride in chlorine cell brines is typically about 10 to 20 grams/liter below the saturation level. The actual salt concentration in the brine depends on various factors, such as mining conditions, conditions for treating the brine, and whether or not other materials are added to the brine between the treating plant and the chlorine cells.

It is desirable to use saturated brine for the feed material to a chlorine cell for several reasons: One reason is that the cell is better able to utilize the power input; another reason is that the yield of the chlorine product is much better from a saturated brine than a solution which is less than saturated. At present, there are two general types of apparatuses useful for increasing the concentration of sodium chloride in brine solution. One of these devices is referred to as upflow saturator (or dissolver), and the other is referred to as a downflow saturator (or dissolver).

In an upflow saturator (bed type) the undersaturated brine and solid salt are introduced into the bottom of an upright saturator tank. The salt forms a bed in the saturator which is fluidized by the upwardly flowing brine, so that the salt dissolves in the brine. If the upward velocity of the brine exceeds about 0.45 ft/min, solid salt is carried over the top of the saturator tank. A saturator of this type, therefore, is undesirable, since it is limited to the fluidizing rate of the solid salt.

A downflow saturator makes use of the principle of gravity. The undersaturated brine enters the top of a tank containing solid salt (usually rock salt). The brine is saturated as it flows downwardly through the salt bed. A major drawback of downflow saturators is that they tend to plug up if fine grain salt is used, such as the type of salt generally available at chloralkali production sites where the brine feed for the chlorine cells is drawn from underground wells.

For example, in downflow saturators where fine grain salt is used, the salt must be supported by a layer of gravel at the bottom of the saturator. Above the gravel layer it is critical to maintain a layer of undisturbed salt at least a foot thick. The solid salt which lies above and in the top layer of gravel, along with very fine, partly dissolved grains which "work" down from above, tend to form a very hard, dense salt cake. In moving through this cake, the brine eventually forms channels in the cake and emerges unsaturated. In addition, extraneous insoluble material may accumulate in the caked mass of salt and gravel. Because of these problems, downflow saturators must be periodically cleaned. If they are left too long without cleaning, the hard salt cake must be broken up, for example, with an air hammer, and then manually removed, along with the gravel.

The use of either of the saturator units described above, in a process for producing chlorine which involves saturating brine from underground wells, would require huge equipment which is not commercially feasible. The upflow brine saturator of this invention eliminates most of the problems associated with saturating weak brine solutions, including the plugging problems of the downflow saturators and the critical nature of the fluidizing rate of the salt in the upflow (bed type) saturators.

SUMMARY OF THE INVENTION

In the practice of this invention, salt is dissolved in an undersaturated (or weak) brine solution to bring the solution to a saturation condition. The apparatus consists primarily of a holding tank and a saturator unit. The saturator unit includes an upright saturator column and a salt slurry feed tube having a smaller diameter than the saturator column. The feed tube is supported inside the column, in coaxial relation to the column, such that an annulus section is defined between the feed tube and the column. The lower end of the feed tube terminates above the lower end of the saturator column. A saturator feed line connects the holding tank into the salt slurry feed tube and a slurry recycle line connects the feed line into the holding tank.

In operation, a salt slurry composition is delivered to the holding tank where it is stored and recycled to bring it up to a desired condition. Part of the recycling salt slurry stream is carried downwardly through the feed tube of the saturator column and, as it discharges through the lower end of the tube, it flows into the annulus section of the column. Undersaturated brine enters the saturator column at the bottom of the column and mixes with the salt slurry from the feed tube. This mixture moves upwardly in the annulus section of the column and in this upward movement the salt dissolves in the brine to produce a saturated brine which is carried out of the column through a brine outlet near the top of the column.

DESCRIPTION OF THE DRAWINGS

The single FIGURE of the drawing is a schematic illustration of one embodiment of the brine saturator apparatus of this invention.

DESCRIPTION OF THE INVENTION

Referring to the drawing, the brine saturator apparatus includes a holding tank 10, which stores a salt slurry 11, specifically, sodium chloride, before the salt is fed to a saturator unit. The salt slurry is brought into tank 10 through a delivery line 12, in which the discharge end is positioned inside the holding tank above the level of the salt slurry. The opposite end of line 12, which is the supply end, connects into a means for supplying the salt slurry to the delivery line. This end of the delivery line and the means for supplying the salt slurry is not illustrated in the drawing. The saturator unit includes an upright saturator column 13 and a salt slurry feed tube 14. The feed tube 14 is smaller in diameter than column 13, and the lower end of this tube terminates a short distance above the cone-shaped bottom end of the saturator column. The feed tube is mounted inside of the saturator column and in coaxial relation to the column. The supporting structure for the feed tube is not shown in the drawing.

A saturator feed line 15 connects the holding tank 10 into the saturator column 13. Holding tank 10 also includes a slurry recycle line 16, which connects at one end into the cone-shaped bottom of tank 10, passes through a centrifugal pump 17, and connects at the opposite end into the saturator feed line 15 near the top of the holding tank. Also, on the opposite side of holding tank 10 from the point at which the delivery line 12 discharges into the tank, is an overflow line 18, for removing the clear phase of the brine solution in the holding tank. Undersaturated brine is directed into the saturator column 13 through a brine inlet line 19, which connects into the bottom of the column. The saturated brine is carried out of the column 13 through a brine outlet line 20 at the top of the column.

OPERATION

The invention can be illustrated by describing a typical operation in which the apparatus is used to prepare saturated brine for use in diaphragm cells to make chlorine. In this operation the slurry stream was a by-product stream from a sodium hydroxide recovery unit, so that it contained a small amount of the caustic product. Following are specific examples of two runs which were conducted in the practice of this invention:

EXAMPLE 1

In the first run, the saturator column 13 was a section of plastic pipe, 19 feet in length and 5.5 inches inside diameter. A salt slurry feed tube 14, which was 1.25 inches outside diameter, was mounted inside the saturator column. The bottom end of the slurry feed tube was about 6 inches above the cone-shaped bottom of the column 13. To start the operation, a salt slurry stream containing from about 5 percent to 60 percent by weight solid sodium chloride was passed into the holding tank 10 and recycled through the tank until the concentration of solid salt in the slurry was about 50 percent by volume (45 percent by weight).

In practice, the actual concentration of the solids in the salt slurry in the holding tank is directly controlled by the discharge rate of the recycle pump 17. A part of the slurry stream which is being recycled, typically from about 10 percent to about 50 percent by volume, is pulled off of the recycle line 16 and pumped through the saturator feed line 15 into the feed tube 14. The remainder of this slurry stream continues to recycle through the holding tank 10. The flow rate of the salt slurry into the feed tube 14 was about 332 cm$^3$/min, with the solids rate being about 166 gm/min.

As the salt slurry flowed out the lower end of the feed tube 14, it was picked up by the undersaturated brine entering column 13 through the brine inlet line 19. The flow rate of the undersaturated brine into the saturator column 13 was about 2 gal/min. The resulting mixture of brine and salt slurry upflows through the annulus section 21 of the saturator column, and during this sequence the salt dissolves in the undersaturated brine. When the solution reaches the brine outlet line 20, it is a fully saturated brine solution. The velocity of the upflowing brine was about 1.9 ft/min, and the time required for the saturated brine to reach the brine outlet line 20, which is referred to as the brine residence time, was about 10 minutes. The undersaturated brine entering the bottom of the saturator column 13 contains about 290 gm/l sodium chloride, and the saturated brine solution at the brine outlet 20 contains about 310 gm/l sodium chloride.

During recycling of the salt slurry in the holding tank 10, the clear phase of the brine solution, which contains a small amount of sodium hydroxide, accumulates at the top of the holding tank opposite from the point at which the salt slurry enters the tank from delivery line 12. This clear brine solution is removed through the brine overflow line 18 and thereafter added to the brine treating system or added to brine which has already been treated to remove undesired materials. The time for this run was about 5 hours. In practice, it was found that best conditions for the chlorine process were obtained when the sodium chloride content of the saturated brine was at a maximum, but did not contain entrained solid salt at the point where the brine leaves the saturator column on its way to the chlorine cells.

EXAMPLE 2

The procedure for the second run was substantially the same as the first run, but the size of the salt slurry feed tube 14 was changed to increase the upflow velocity of the brine and thus decrease the brine residence time in the saturator column 13. The saturator column used in the second run was the same size as that used in the first run, but the feed tube 14 mounted inside the column was 3.69 inches outside diameter. The salt slurry stream to the feed tube 14 contained the same amount of solids as in the first run, that is, about 50 percent by volume, or 45 percent by weight solids. The flow rate of the salt slurry into the feed tube 14 was about 199 cm$^3$/min and the flow rate of the solids therein was about 110 g/min. The flow rate of the undersaturated brine into the saturator column 13 was the same as that of the first run, that is, about 2 gal/min.

The upflow velocity of the brine was about 2.7 ft/min and the brine residence time was about 7 minutes. The undersaturated brine solution entering the bottom of the saturator column 13 contained about 301 gm/l sodium chloride and the saturated brine solution at the brine outlet 20 contained about 313 gm/l sodium chloride. The time required for this run was about three hours.

The invention claimed is:

1. A method for dissolving salt in an undersaturated brine solution to thereby saturate the brine solution, comprising the steps of:

storing a salt slurry composition in a holding tank;

drawing a stream of the salt slurry composition out of the holding tank and continuously recycling a first part of said stream back into said holding tank;

passing a second part of the salt slurry composition stream downwardly through a feed tube supported inside of an upright saturator column, and in coaxial relation to the saturator column;

discharging the salt slurry composition through the lower end of the feed tube, such that the slurry composition flows into an annulus defined between the saturator column and the feed tube;

flowing a stream of undersaturated brine into the saturator column to mix with the salt slurry composition being discharged from the feed tube;

causing the resulting mixture to move upwardly in the column annulus section, to dissolve the salt of the slurry composition in the undersaturated brine and thereby produce saturated brine; and carrying the saturated brine out of the saturator column through a brine outlet line at the top of said column.

2. The method of claim 1 in which the second part of the salt slurry composition stream comprises from about 10 percent to 50 percent by volume of said stream.

3. The method of claim 1 in which the second part of the salt slurry composition contains about 50 percent by volume solid sodium chloride.

4. The method of claim 1 in which the undersaturated brine flows into the saturator column at about 2 gallons per minute.

5. The method of claim 1 in which the residence time of the brine solution in the annulus section of the saturator column is from about 7 minutes to 10 minutes.

6. The method of claim 1 in which the saturated brine contains 26 percent by weight sodium chloride.

* * * * *